UNITED STATES PATENT OFFICE.

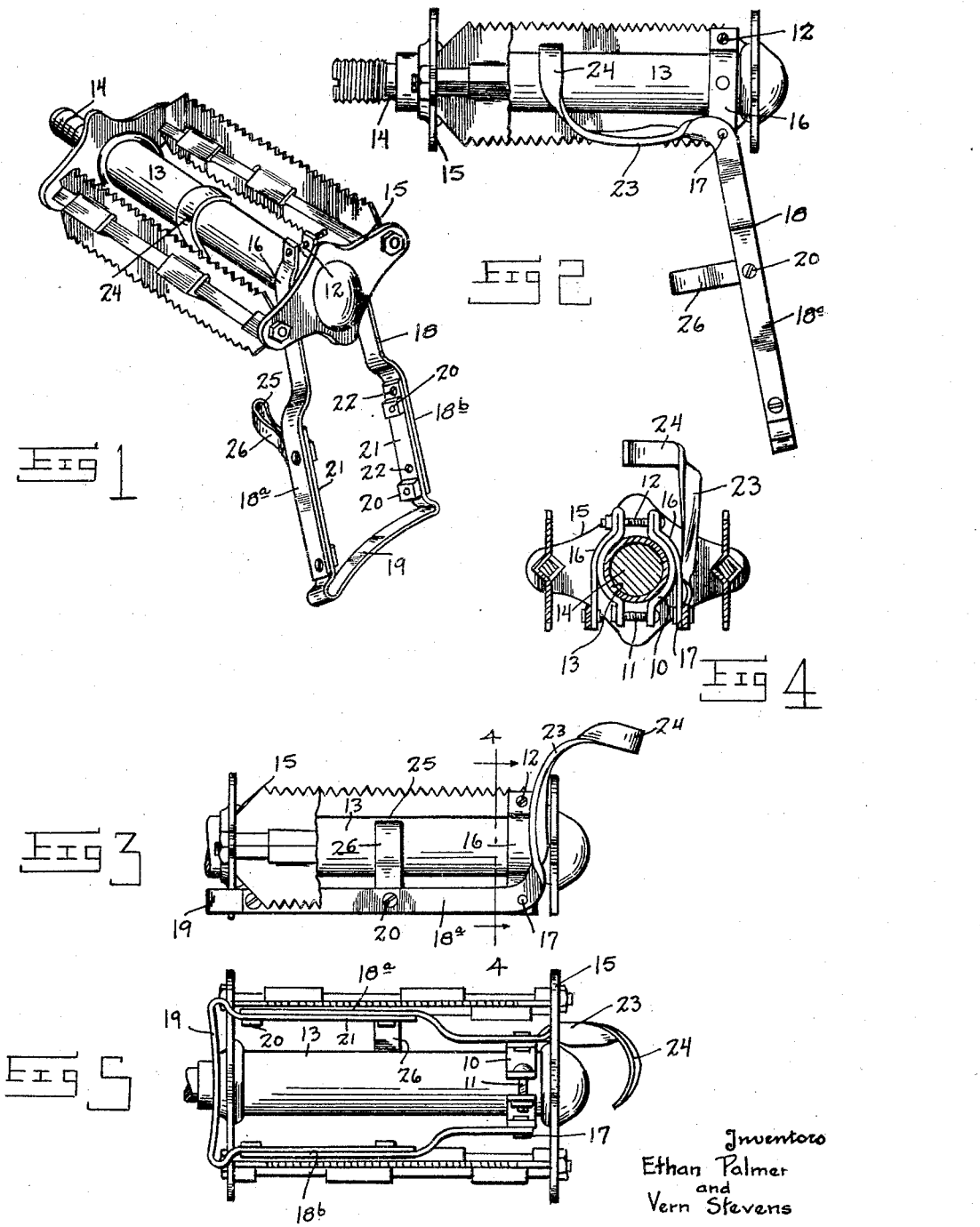

ETHAN PALMER AND VERN STEVENS, OF SPOKANE, WASHINGTON.

BICYCLE-SUPPORT.

1,364,407.

Specification of Letters Patent. Patented Jan. 4, 1921.

Application filed October 6, 1919. Serial No. 328,634.

*To all whom it may concern:*

Be it known that we, ETHAN PALMER and VERN STEVENS, joint inventors, citizens of the United States of America, residing at Spokane, in the county of Spokane and State of Washington, have invented new and useful Improvements in Bicycle-Supports, of which the following is a specification.

This invention pertains to bicycle supports and has for its object to provide an improved mechanism for mechanically resting a bicycle in an upright position when not in use.

The improved device not only provides a support for one of the pedals but provides means for positively setting the angle of the support, means for securing the same in a folded position and means for contact with the foot so that the same may be kicked by the foot to an expanded or to a folded position. The invention consists of the construction hereinafter particularly described, set forth in the claims and illustrated in the accompanying drawings, in which, Figure 1, is a perspective view of a bicycle pedal with the improved support applied thereto and shown in an expanded position.

Fig. 2, is a broken-away side elevation of the same.

Fig. 3, is a broken-away side elevation of the same with the support applied thereto and shown in a folded position.

Fig. 4, is a sectional view taken on the line 4—4 of Fig. 3, and,

Fig. 5, is a bottom view of the same with the support applied thereto and shown in a folded position.

In a detail description in which like numerals refer to like parts throughout the several views, we have shown a clamp 10 attached by means of bolts 11 and 12 to the sleeve 13 of the shaft 14 of the pedal 15, Fig. 4. Secured by the bolt 12 are downwardly extending wings 16 resting astride of the clamp 10 and having their lower ends 17 expanded, to which are pivotally secured a jack 18. The jack 18 comprises the two side supports $18^a$ and $18^b$ and a base support 19. The base 19 is made adjustable by securing the same to the sides $18^a$ and $18^b$ by means of bolts 20 passing through openings in the sides $18^a$ and $18^b$ and through openings in upwardly extending portions 21 of the base 19. Additional openings 22 are provided in the extensions 21 for the insertion of the bolts 20. At the upper end of the jack 18 and extending at substantially right angles therewith is an arm 23 having a hook 24 at the outer end thereof. Secured to one of the sides $18^a$ of the jack 18 and extending at substantially right angles therewith and having an inwardly inclined end 25 is a spring 26. When the support is not in use the same is allowed to remain in a folded position as shown in Figs. 3 and 4. When it is desired to use the same, the operator kicks inwardly with his foot on the arm 23 or hook 24, throwing the support parts to the positions shown in Figs. 1 and 2, the sides $18^a$ and $18^b$ inclining outwardly somewhat from the perpendicular, and the hook 24 engaging the sleeve 13 of the pedal 15. This makes the support rigid with the base 19 resting against the ground or pavement. When it is desired to again use the bicycle, the operator kicks the jack 18 inwardly with his foot, which throws the support parts to the positions shown in Figs. 3 and 4, with the spring 26 tightly engaging the sleeve 13 of the pedal 15.

What is claimed is:

1. The combination of a pedal frame having a longitudinally arranged shaft and a sleeve thereto with a support comprising a foldable jack pivotally secured to said sleeve, with an arm at the upper end of said jack as a means for actuation, and a hook on the end of said arm as a means for engagement with said sleeve to hold the jack in a rigid position when expanded.

2. The combination of a pedal frame having a longitudinally arranged shaft and a sleeve thereto with a support comprising a foldable jack pivotally secured to said sleeve, with an arm at the upper end of said jack as a means for actuation and a hook on the end of the arm, and a spring secured to said jack for engagement with said sleeve to hold said jack in a rigid position when folded.

In testimony whereof, we affix our signatures in presence of two witnesses.

ETHAN PALMER.
VERN STEVENS.

Witnesses:
JOSEPH MCCARTHY,
L. L. WESTFALL.